US008805081B2

(12) United States Patent
Chotard et al.

(10) Patent No.: US 8,805,081 B2
(45) Date of Patent: Aug. 12, 2014

(54) OBJECT DETECTION IN AN IMAGE

(75) Inventors: Ludovic Chotard, Saint Egrève (FR); Michel Sanches, Le Pont de Claix (FR); Vitor Schwambach, Recife (BR); Mahesh Chandra, Uttar Pradesh (IN)

(73) Assignees: STMicroelectronics (Grenoble 2) SAS, Grenoble (FR); STMicroelectronics PVT Ltd, Uttar Pradesh (IN)

( * ) Notice: Subject to any disclaimer, the term of this patent is extended or adjusted under 35 U.S.C. 154(b) by 438 days.

(21) Appl. No.: 13/100,081

(22) Filed: May 3, 2011

(65) Prior Publication Data

US 2011/0299783 A1    Dec. 8, 2011

(30) Foreign Application Priority Data

May 6, 2010 (EP) .................................... 10305478

(51) Int. Cl.
*G06K 9/46* (2006.01)

(52) U.S. Cl.
USPC ........... 382/190; 382/191; 382/192; 382/194; 382/195

(58) Field of Classification Search
None
See application file for complete search history.

(56) References Cited

U.S. PATENT DOCUMENTS

| 4,484,349 A | 11/1984 | McCubbrey |
| 7,027,665 B1 | 4/2006 | Kagle et al. |
| 7,315,631 B1 | 1/2008 | Corcoran et al. |
| 7,634,142 B1 | 12/2009 | Bourdev et al. |
| 2002/0102024 A1* | 8/2002 | Jones et al. .................... 382/225 |
| 2004/0013304 A1 | 1/2004 | Viola et al. |
| 2005/0180627 A1 | 8/2005 | Yang et al. |
| 2007/0183686 A1* | 8/2007 | Ioffe .............................. 382/291 |
| 2009/0161912 A1 | 6/2009 | Yatom et al. |
| 2009/0175533 A1* | 7/2009 | Sabe et al. ..................... 382/159 |
| 2009/0256926 A1 | 10/2009 | Okada et al. |
| 2009/0324087 A1* | 12/2009 | Kletter ........................... 382/195 |
| 2010/0202703 A1* | 8/2010 | Jeon et al. ...................... 382/209 |
| 2010/0272363 A1 | 10/2010 | Steinberg et al. |
| 2011/0052004 A1* | 3/2011 | Lee et al. ....................... 382/103 |

FOREIGN PATENT DOCUMENTS

WO    WO 2008/107002 A1    9/2008

OTHER PUBLICATIONS

He, Chun et al., "A Novel SoC Architecture on FPGA for Ultra Fast Face Detection," ICCD '09 Proceedings of the 2009 IEEE International Conference on Computer Design, Oct. 4-7, 2009, pp. 412-418.

(Continued)

*Primary Examiner* — Jason M Repko
*Assistant Examiner* — David Perlman
(74) *Attorney, Agent, or Firm* — Slater & Matsil, L.L.P.

(57) ABSTRACT

The invention concerns a method of performing, by an image processing device, object detection in an image comprising: performing one or more tests of a test sequence for detection of a first object on pixels values of a plurality of at least partially overlapping sub-regions (310, 312, 314) of a first search window (108); generating a cumulative score based on results of said one or more tests on said plurality of sub-regions; comparing said cumulative score with a threshold value; and based on said comparison, selectively performing one or more of said tests of said test sequence on at least one further sub-region of said first search window, said at least one further sub-region at least partially overlapping each of said plurality of sub-regions.

26 Claims, 5 Drawing Sheets

(56) References Cited

OTHER PUBLICATIONS

"Pipeline (computing)," //en.wikipedia.org/wiki/Pipeline_(computing); From Wikipedia, the free encyclopedia, Apr. 15, 2010, 3 pages.
Hiromoto, M., et al., "Partially Parallel Architecture for AdaBoost-Based Detection With Haar-Like Features," IEEE Transactions on Circuits and Systems for Video Technology, vol. 19, No. 1, Jan. 2009, pp. 41-52.
Ruiz, J.A., et al., "Face Detection by Cascade of Gaussian Derivates Classifiers Calculated With a Half-Octave Pyramid," IEEE, 2008, 6 pgs.
Zhu, Q., et al., "Fast Human Detection Using a Cascade of Histograms of Oriented Gradients," IEEE Computer Society Conference on Computer Vision and Pattern Recognition, Mitsubishi Electric Research Laboratories, Jun. 2006, 10 pgs.
European Search Report issued in European Patent Application No. 10 30 5478 on Feb. 7, 2011 (3 pages).

* cited by examiner

OBJECT DETECTION IN AN IMAGE

This application claims the priority benefit of European patent application number 10305478.9, filed May 6, 2010, entitled "Object Detection in an Image," which is hereby incorporated by reference to the maximum extent allowable by law.

TECHNICAL FIELD

The present invention relates to a method and apparatus for performing object detection in an image, and in particular to a method and apparatus for performing face detection.

BACKGROUND

Object detection techniques generally involve searching an image for reference patterns. One such technique, for example described in publication titled "Partially Parallel Architecture for AdaBoost-Based Detection With Haar-like Features", (Hiromoto et al., IEEE transactions on circuits and systems for video technology, VOL. 19, No. 1, January 2009) involves the use of Haar-like features. A search window is moved across an image, and at each location, blocks of pixels within the search window are analysed based on the Haar-like features using a cascade of tests in order to detect patterns that can indicate the presence of a certain object such as a face.

While the use of cascades of tests for object recognition tends to provide good rates of detection, it is relatively demanding on processing resources. In certain applications, it would be beneficial to be able to use face detection for auto-focus and automatic exposure controls. In particular, in electronic image capturing devices such as digital cameras or mobile telephones, prior to capturing and storing to memory a "final" image, the image data from the image sensor can be used to detect focus and exposure conditions, enabling the image sensor and/or a lens system to be controlled appropriately during the subsequent image capture. Given that when faces are present in an image it is particularly desirable that they have correctly adapted focus and exposure, knowing the location of any faces in the image would be beneficial.

However, due to the computationally demanding nature of object detection, there is a technical problem in performing such detection in real time or near real-time, particularly on compact devices having limited processing resources.

SUMMARY OF THE INVENTION

According to one aspect of the present invention, there is provided a method of performing, by an image processing device, object detection in an image comprising: performing one or more tests of a test sequence for detection of a first object on pixels values of a plurality of at least partially overlapping sub-regions of a first search window; generating a cumulative score based on results of said one or more tests on said plurality of sub-regions; comparing said cumulative score with a threshold value; and based on said comparison, selectively performing one or more of said tests of said test sequence on at least one further sub-region of said first search window, said at least one further sub-region at least partially overlapping each of said plurality of sub-regions.

According to a further aspect of the present invention, there is provided a device for performing object detection in an image comprising: a memory storing said image; and an object detection block arranged to: perform one or more tests of a test sequence for detection of a first object on pixels values of a plurality of at least partially overlapping sub-regions of a first search window; generate a cumulative score based on results of said one or more tests on said plurality of sub-regions; compare said cumulative score with a threshold value; and based on said comparison, selectively perform one or more tests of said test sequence on at least one further sub-region of said first search window, said at least one further sub-region at least partially overlapping each of said plurality of sub-regions.

According to a further aspect of the present invention, there is provided an object detection unit for detecting an object in an image comprising: a resize unit adapted to resize said image; an image integration unit adapted to generate an integral image window by calculating, for each pixel value in the resized image, an integral value equal to the sum of one or more of said pixel values; and a processing block arranged to process said integral image window to detect an object, wherein said resize unit, image integration unit and processing block are adapted to operate in parallel.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF ILLUSTRATIVE EMBODIMENTS

Before addressing the illustrated embodiments in detail, various embodiments and advantageous features thereof are discussed generally. It is an aim of embodiments of the present invention to at least partially address one or more needs in the prior art.

Some embodiments provide for a method of performing, by an image processing device, object detection in an image comprising: performing one or more tests of a test sequence for detection of a first object on pixels values of a plurality of at least partially overlapping sub-regions of a first search window; generating a cumulative score based on results of said one or more tests on said plurality of sub-regions; comparing said cumulative score with a threshold value; and based on said comparison, selectively performing one or more of said tests of said test sequence on at least one further sub-region of said first search window, said at least one further sub-region at least partially overlapping each of said plurality of sub-regions.

According to one embodiment, each of said one or more tests comprises: determining a stage score based on selected pixel values of the sub-region; comparing said stage score with a stage threshold value; and selectively performing one or more further tests on pixel values of the sub-region based on said comparison.

According to another embodiment, each of said one or more tests comprises analysing one or more Haar-like features within said plurality of sub-regions. According to yet another embodiment, said plurality of sub-regions comprises first, second and third sub-regions.

According to still other embodiments, if said comparison indicates that said cumulative score is not greater than said threshold, performing one or more tests of said test sequence on a plurality of at least partially overlapping sub-regions of a second search window, wherein said second search window is offset with respect to the first search window by a plurality of pixels in at least one direction.

In some embodiments, prior to performing said one or more tests on said plurality of sub-regions of the second search window, performing one or more tests of a second test sequence for detection of a second object on pixel values of said at least partially overlapping sub-regions of the first search window.

According to one embodiment, said first search window is between 10 and 30 percent larger than each of said plurality of sub-regions. According to another embodiment, said pixel values are integral values each equal to a sum of the pixels of a determined area. According to yet a further embodiment, there is provided a method of performing face detection comprising the above method of performing object detection.

Other embodiments provide for a device for performing object detection in an image comprising: a memory storing said image; and an object detection block arranged to: perform one or more tests of a test sequence for detection of a first object on pixels values of a plurality of at least partially overlapping sub-regions of a first search window; generate a cumulative score based on results of said one or more tests on said plurality of sub-regions; compare said cumulative score with a threshold value; and based on said comparison, selectively perform one or more tests of said test sequence on at least one further sub-region of said first search window, said at least one further sub-region at least partially overlapping each of said plurality of sub-regions. In some embodiments, the device comprises a digital camera.

Yet other embodiments provide for an object detection unit for detecting an object in an image comprising: a resize unit adapted to resize said image; an image integration unit adapted to generate an integral image window by calculating, for each pixel value in the resized image, an integral value equal to the sum of one or more of said pixel values; and a processing block arranged to process said integral image window to detect an object, wherein said resize unit, image integration unit and processing block are adapted to operate in parallel.

According to one embodiment, the resize unit, image integration unit and processing block are configured such that while a first image is being resized by said resize unit, a first window of a second image is being integrated by said image integration unit, and a further window of said second image is being processed by said processing block to detect an object.

According to another embodiment, the image integration unit is further configured to determine an integral square image.

According to another embodiment, the object detection unit further comprises a memory arranged to store: said image; a resized image for processing by said integration unit; and at least part of an image being resized by said resize unit.

According to another embodiment, the object detection unit further comprises a circular buffer arranged to store said integral image window during the objection detection performed by said processing block.

According to another embodiment, the object detection unit further comprises a programmable memory configured to store at least one test sequence applied during the object detection performed by said processing block.

According to another embodiment, said processing block comprises a microprocessor adapted to execute a first instruction set and an arithmetic unit adapted to perform specific operations.

According to yet another embodiment, the object detection unit further comprises a buffer arranged to store said integral image window prior to processing by said processing block, wherein each value of said integral image for a given pixel position is determined based on a sum of pixels of a rectangle, one corner of the rectangle corresponding to the given pixel position, and a diagonally opposite corner of the rectangle corresponding to a corner of the image, wherein said integral image is processed in overlapping strips of said image extending from one edge of the image to an opposite edge, and wherein all the values stored in said buffer are overwritten at the start of each new strip. The buffer for example has a size adapted to store at most the twice the number of integral pixel values of one of said integral image windows.

Attention will now be turned to specific illustrated embodiments. For clarity, only those steps and elements useful in an understanding of the invention have been represented in the figures and will be described in detail. For example, the details of the Haar-like features tested in the cascades described herein have not been explained in detail, such details being apparent to those skilled in the art.

While embodiments of the present invention have been described in relation to cascades of tests based on Haar-like features, the invention may be applied to other types of test cascades. Examples of such tests include the use of Gaussian Derivative features, as described in the publication "Face Detection by Cascade of Gaussian Derivates Classifiers Calculated with a Half-Octave Pyramid", Ruiz-Hermandez et al., and the use of Oriented Gradients, as described in "Fast Human Detection Using a Cascade of Histograms of Oriented Gradients", Qiang Zhu et al. Also, in the following examples, face detection is described, whereas it will be apparent to those skilled in the art that the invention could be equally applied to the detection of other objects.

Figure 1:
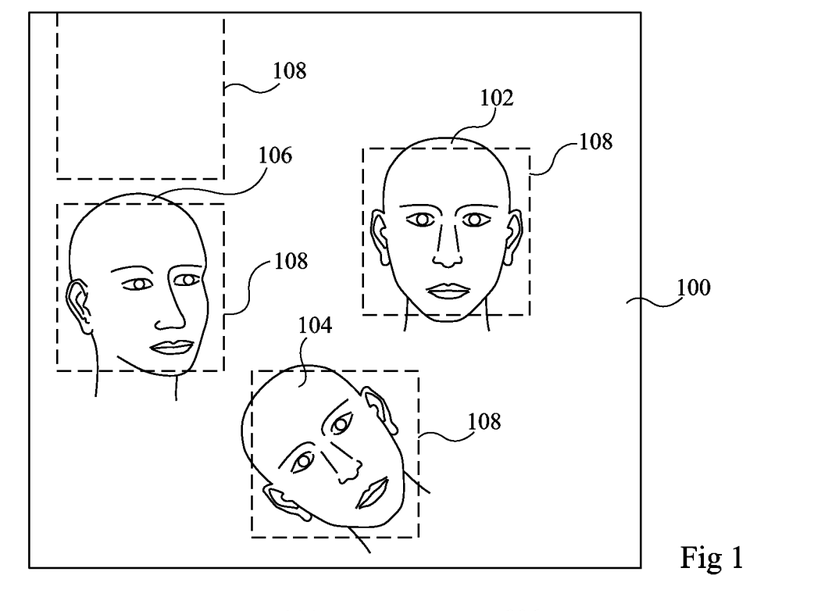
FIG. 1 illustrates an image depicting a number of faces.

FIG. 1 illustrates an image 100, for example of 320 by 240 pixels, depicting three faces 102, 104 and 106. Face 102 is orientated head-on and upright, while face 104 is orientated head-on but tilted by around 45° to one side, and face 106 is upright but turned to one side by around 45°.

To detect the faces 102, 104 and 106, three different searches are for example performed. In particular, a search window 108 scans across the image 100, and the blocks of pixels delimited by the search window are analysed one after the other to detect each orientation of the face. The search window 108 for example scans from the top left-hand corner of the image towards the bottom right-hand corner of the image, moving downwards in columns, referred to herein as strips, until the bottom of the image is reached, and then returning to the top of the adjacent strip. The following description is based on this vertical scanning of the image, but it will be apparent to those skilled in the art that the same technique could be applied horizontally in the image.

A face can be detected when the search window 108 is positioned over a face, for example when the search window 108 is positioned over faces 102, 104 and 106 as shown in FIG. 1. In some cases, a face to be detected in an image might be tilted not at exactly 45° or upright, but somewhere in between. To allow the detection of such faces, the detection algorithm for example has a tolerance such that faces between 10° and 15° away from a given orientation still result in a positive match. Furthermore, for orientations outside these tolerances, a positive match can still be deduced from adequate scores for each orientation.

Figure 2:
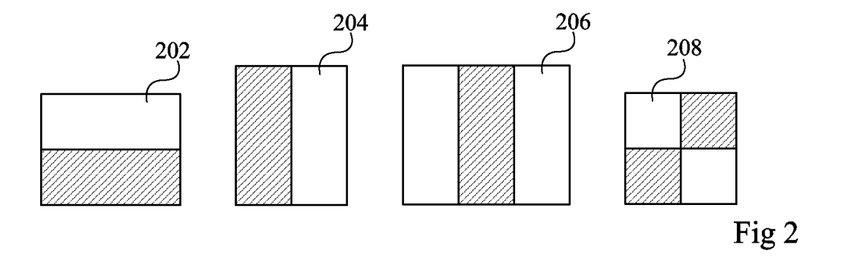
FIG. 2 illustrates examples of Haar-like features.

FIG. 2 illustrates some examples of Haar-like features based on which object detection of an object such as a face can be performed. The Haar-like features are made up of rectangular blocks, within which the pixel values are added. The pixel values for example correspond to luminance values. In particular, the image may be represented in YUV or YCbCr format, where Y is a luminance value and UV/CbCr are two chrominance values for a given pixel. Only the luminance values are used. Each Haar-like feature comprises one or more "positive" regions, represented by un-shaded rectangles in FIG. 2, and one or more "negative" regions, represented by shaded rectangles in FIG. 2. To apply a test based on a Haar-like feature, the sum of all of the pixel values in the negative region(s) is/are subtracted from the sum of all of the pixel values in the positive region(s), and a comparison is performed to check whether the result is between two threshold values. This test based on one Haar-like feature is known as a "weak learner", and provides relatively little information on its own, but is a powerful tool when grouped with hundreds or thousands of other weak learner tests.

In the examples of FIG. 2, a Haar-like feature 202 comprises an un-shaded rectangle above a shaded rectangle, a Haar-like feature 204 comprises an un-shaded rectangle to the right-hand side of a shaded rectangle, a Haar-like feature 206 comprises a shaded rectangle sandwiched between a pair of un-shaded rectangles and a Haar-like feature 208 comprises four rectangles forming a square, one pair of the diagonally opposite rectangles being shaded, and the other pair being un-shaded.

For face detection, the Haar-like features enable transitions in the luminosity texture across the image to be detected, which correspond closely to what should be recognized as features of a face. For example, the Haar-like feature 202 can for example be used to detect transitions corresponding to an eye or lips, the Haar-like feature 206 can be used to detect transitions corresponding to a nose, etc. Other Haar-like features could be used, including the inverse of the ones of FIG. 2, in which the positive regions are negative and vice-versa.

Figure 3:
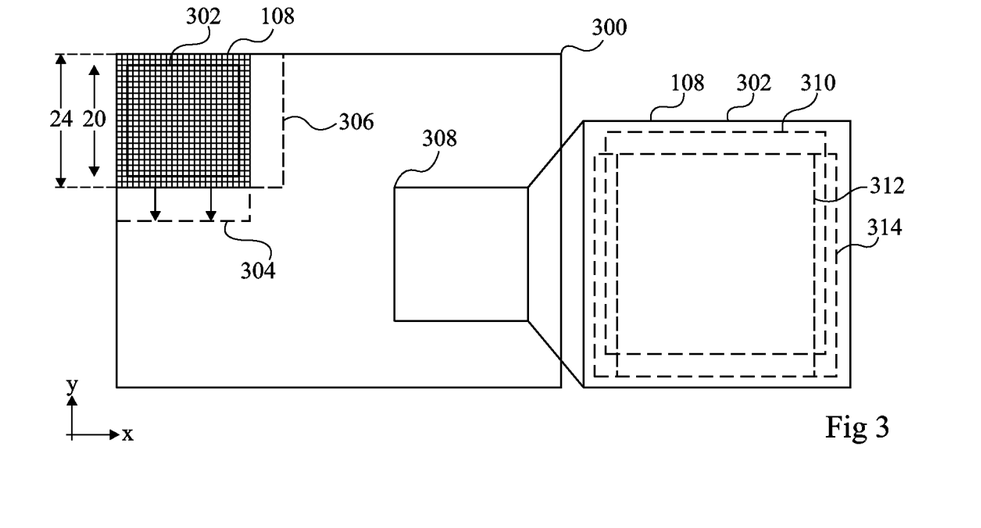
FIG. 3 shows a search window for searching an image according to an embodiment of the present invention.

FIG. 3 illustrates an image 300, which in this example is 80 by 60 pixels. The search window 108 is shown, in this example having a size of 24 by 24 pixels. Within this search window 108, a search sub-block 302 is used, in this example having a size of 20 by 20 pixels, as will now be described in more detail.

As the search window 108 is scanned down and across the image 300, rather than being incremented in steps of one pixel in the x or y direction at a time, it is moved in larger increments of a plurality of pixels at a time, in this example 5 pixels at a time. For example, an initial position of the search window 108 in the top left of the image 300 is shown, and a next position of the search window would be this position shifted by five pixels towards the bottom of the image, as represented by the dashed line 304. The search window continues shifting downwards in increments of 5 pixels until the bottom of the image is reached, and then it returns to the top of the image, shifted five pixels to the right with respect to the initial position, as represented by dashed line 306.

Whereas the search window 108 is 24 by 24 pixels, a search is performed based on the 20 by 20 pixels of the search sub-block 302. Thus for each position of the search window 108, there are 25 possible overlapping but not identical positions of the search sub-block 302 within this block, and therefore, 25 searches could be performed for each increment of the search window 108 in order to perform a search having a one pixel granularity.

Each search of the search sub-block 302 involves applying a cascade of Haar-like features. The Haar-like features are positioned at locations where the corresponding facial features are expected to be located. For example, the nose can be assumed to be at the centre of the search sub-block, and the eyes, eyebrows and mouth positioned relative to this. Such a search is thus aimed at a face of a certain size within the search window 108. In practise, as faces in the image may be of different sizes, the image to be searched is for example resized multiple times to enable a relatively wide range of face sizes to be detected.

To obtain a match, the search sub-block 302 must generally be positioned over the image with a tolerance of a pixel width or less. However, according to the embodiments described herein, the search is initially performed with the search sub-block 302 positioned at a few determined positions within the search window 108, and the search continues for other positions of the search sub-block 302 only if the results of object detection at the first positions are at least partially successful, as will be described in more detail below.

By way of example, when the search window 108 has its top left-hand corner at a position 308 in image 300, a test sequence based on first, second and third positions of the search sub-block 302 is performed, illustrated by dashed boxes 310, 312 and 314 respectively in a blow-up view of the search window 108. Assuming that no positive face detection is made at any of these first three positions of the search sub-block, if a cumulative score of these cascades is above a threshold, one or more subsequent positions of the search sub-block 302 in the search window 108 are then tested. However, if the cumulative score for these three positions of the search sub-block 302 does not exceed the threshold, the tests on this position of the search window 108 are stopped, and the position of the search window 108 is incremented. In this way, rather than testing each of the 25 positions of the search sub-block 302 within the search window 108, a detection of a face in the 24 by 24 pixel search window 108 may be ruled out more quickly after only performing a few tests. This can greatly reduce the overall number of tests that are performed to complete the face detection cascades for an image.

An example of the order that the positions of the search sub-block 302 within the search window 108 are tested will now be described with reference to FIG. 4.

Figure 4:
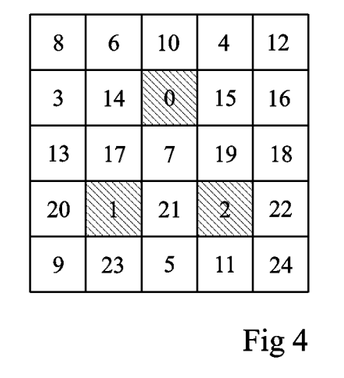
FIG. 4 is a table representing the order of a sub-window search according to an embodiment of the present invention.

FIG. 4 shows a grid of 5 by 5 cells, wherein each cell represents a different one of the 25 possible positions for the top left-hand corner pixel of the search sub-block 302 within the search window 108. Thus, for example, the top left-hand cell in the grid corresponds to the search sub-block 302 being positioned with its top left-hand corner at the top left-hand corner of the search window 108. The bottom right cell in the grid corresponds to the top left-hand corner of the search sub-block 302 being shifted 4 pixels to the right and 4 pixels down in the search window 108. The numbers 0 to 24 in each cell represent the order that the respective positions of the search sub-block 302 are tested, starting with 0, and ending at 24. Calling the top left cell in the grid position (0,0) and the bottom right cell in the grid position (4,4), the order is for example: (2,1); (1,3); (3,3); (0,1); (3,0); (2,4); (1,0); (2,2); (0,0); (0,4); (2,0); (3,4); (4,0); (0,2); (1,1); (3,1); (4,1); (1,2); (4,2); (3,2); (0,3); (2,3); (4,3); (1,4); and (4,4). The positions 0, 1 and 2 are shown as striped, indicating that these positions are preferably tested during an initial phase, and only if the score for these positions is above a certain threshold will the testing continue for the other positions 3 to 24. The present inventors have found that this particular order of analysing the cells is particularly good at providing good spatial coverage, and good global coverage, and allows the sequence to be interrupted after a few positions if the tests no longer generate good results, with relatively low likelihood of missing a face.

Rather than performing tests on all of the remaining positions 3 to 24 of the search sub-block 302 if the score is above the threshold, one or more additional threshold tests may be set. For example, a subset of these positions may be tested, such as positions 3 to 10, and only if the cumulative score after these tests is above a second threshold will the test sequence continue for positions 11 to 24.

Figure 5:
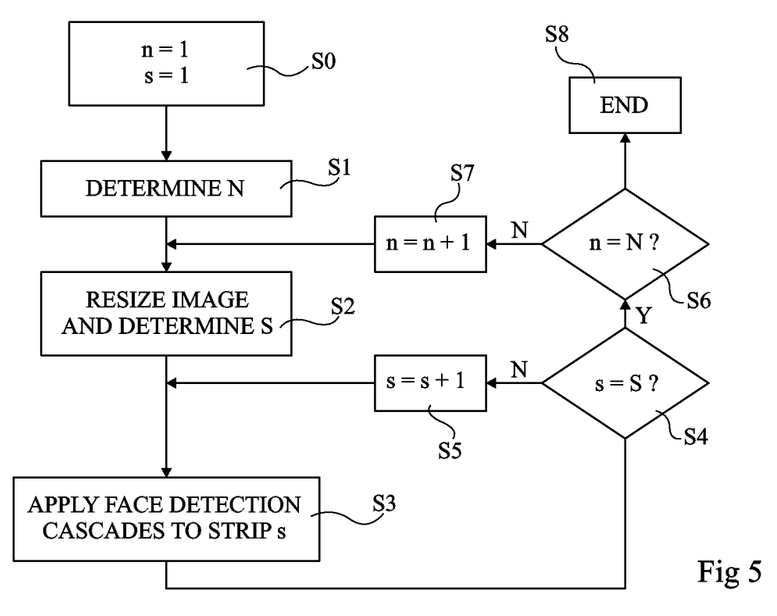
FIGS. 5 and 6 are flow diagrams illustrating a method of face detection according to an embodiment of the present invention.

FIG. 5 is a flow diagram showing steps in a method of performing face detection. In a first step S0, values "n" and "s" are each initialized to a value of one. In a next step S1, the number N of resized images to be tested is determined. In one embodiment, the initial image is 320 by 240 pixels, and this image is resized by a factor of 0.9 at each resizing step. Thus the image sizes to be tested are 320 by 240, 288 by 216, 260 by 192, . . . etc. until 28 by 21, and the total number N of different image sizes to be tested is equal to 23. If the full size of the image is constant, the value of N can also be constant, in which case step S1 is not needed.

It should be noted that the height of 21 pixels of this final image size is smaller than the search window 108, which is 24 pixels high, but is chosen to be just larger than the search sub-block 302.

In a next step S2, the image is resized based on a first resize coefficient, and a number S of strips in the resulting image is determined. In the present example, during a first resize operation, the full size image is reduced to its smallest size directly, in order that the largest face filling the whole of the image can be detected. The resize increments are for example based on a factor of 0.9. Thus a resize coefficient equal to $0.9^{23}$ is applied directly to the 320 by 240 image, leading to a smallest resized image of 28 by 21 pixels. Generally then, for each resize iteration n, the resize coefficient is equal to $0.9^{(N-n)}$. Alternatively, the image could be resized in a different order. The value S is the number of strips to be evaluated from left to right across the image, and is for example equal to floor $(W_I-W_{SW}/Q_H)+1$, where $W_I$ is the width of the image, here initially equal to 28 pixels, $W_{SW}$ is width of the search window 108, here equal to 24 pixels, $Q_H$ is the horizontal increment size between strips, here equal to 5 pixels, and floor(x) is the floor function of x equal to the largest integer not greater than x. Thus initially S is equal to 1. For the image resolution 35 by 26 pixels, the number of strips is equal to 3.

In a next step S3, face detection cascades are applied to strip s, which is initially the first strip, as s is equal to 1. The first strip is for example the left-hand strip in the image.

In a next step S4, it is determined whether or not s=S. Initially, this is not the case, and thus the next step is S5, in which s is incremented, and the method returns to step S3. If however in step S4 s is equal to S, the next step is S6.

In step S6, it is determined whether or not n=N. If not, the next step is S7, in which n is incremented, and then the method returns to step S2, in which the image is again resized based on a different resize coefficient, and a new value of S is determined. These loops continue until all of the N image sizes have been evaluated, at which point n is equal to N, and thus the step after S6 is S8 in which the method ends.

Figure 6:
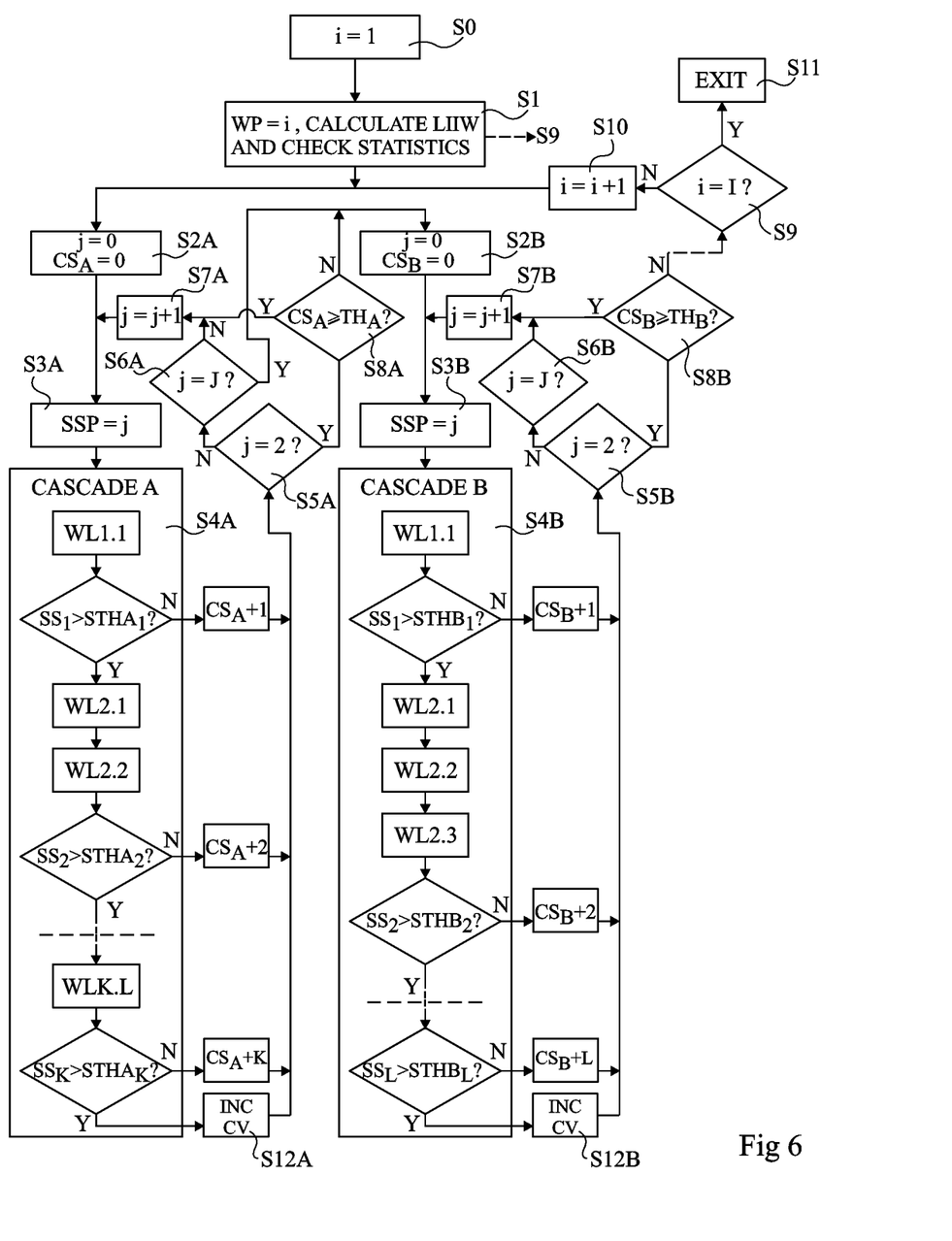

FIG. 6 shows an example of the steps for implementing step S3 of FIG. 5, in other words the face detection cascades for a strip s.

In a first step S0, value "i" is initialized to a value of 1. The value "i" is used to track the position of the search window 108 in each strip. In particular, the incremental positions of the search window 108 within the strip being processed of the image 300 are designated references 1 to I, where for example the position 1 corresponds to the search window 108 being at the top position in the strip, and the position I corresponds to the search window 108 being at bottom of the strip. While not shown in step S0, at this time, the number I of increments in the step can be determined. This value I is for example calculated as floor $((H_I-H_{SW})/Q_V)+1$, where $H_I$ is the height of the image, $H_{SW}$ is the height of the search window, for example equal to 24, and $Q_V$ is the vertical increment size, in this case the same as the horizontal increment size $Q_H$, which is 5 pixels. The initial image size, the height of which is smaller than the search window height, is a special case for which the full size search window is not used, and all of the positions of the search sub-block 302 within this image size are for example systematically tested. For the subsequent image size, equal to 32 by 24, the image height is equal to the height of the search window, and thus I is equal to just one, in other words there is one position of the search window 108, with no additional increments vertically. The same value of I is valid for all of the strips of the image.

In a next step S1, the window position WP of the search window 108 is set to position i, and the local integral image window (LIIW) is calculated, as will be described in more detail below. The local integral image window is calculated to facilitate the calculation of the implementation of the weak learners. Also in step S1, some statistics of the central search sub-block of the current search window i are determined and used to abort the testing of the current search window straight away if it is determined that a face is not present. For example, the integral square image is calculated, and used to determine the standard deviation of the pixel values in the search sub-block.

If it is determined that the statistics of the pixel values are not compatible with the presence of a face, the next step, as indicated by a dashed line, is S9 directly, which is described in more detail below.

Otherwise, in a next step S2A, values j and $CS_A$ are initialized at zero.

Then, in a next step S3A, the search sub-block position (SSP) is set to the value j. In particular, the positions of the search sub-block within the search window i are numbered 0 to J, where J is for example equal to 24.

Next, a first test cascade S4A is next performed for a first few positions 0 to 2 of the search sub-block 302 of the search window 108, based on the local integral image window LIIW determined in step S1. The cascade A for example corresponds to a first orientation of the face, such as the head-on orientation 102 of FIG. 1. The cascades comprise stages, each comprising one or more weak learners and a comparison step.

In a first step of the cascade A, a first weak learner WL 1.1 is calculated. This involves applying a Haar-like feature to the integral pixel data within the search sub-block 302. As described above, each Haar-like feature is located at a determined position, depending on the feature to be detected. For example, to detect a nose, it may be located close to the centre of the search sub-block 302. The sum of the pixel values in the shaded rectangles of the Haar-like feature is determined, and subtracted from the sum of the pixel values in the un-shaded rectangles of the Haar-like feature, and this computation is aided by the pre-calculated LIIW representation. The result is then compared to high and low thresholds, and if falling within this range, the result is weighted to generate a score for this weak learner, which is used to determine an overall stage score $SS_1$ for the stage, as described below. If the result falls outside the thresholds, it is discarded, and does not contribute to the overall stage score.

In this example, the first stage comprises just one weak learner WL 1.1, and thus the next step is the comparison step of the stage. In this step, the stage score $SS_1$ is compared with a threshold value $STHA_1$ for this first stage of cascade A, to determine whether or not the first test has been successful. If not, the cascade is exited immediately, a cumulative score $CS_A$ for cascade A is incremented by 1, and the next step is S5A. If however in step S3B the stage score $SS_1$ is above the threshold $STHA_1$, the cascade continues to a next stage.

The next stage comprises weak learners WL 2.1 and WL 2.2, in which Haar-like features are again applied, and a comparison step, in which the stage score $SS_2$ of this second stage is compared to a corresponding threshold $STHA_2$. If the stage score $SS_2$ is found to be above the threshold, cascade A continues. However, if the stage score $SS_2$ is found to be below the threshold, the cascade is exited immediately, the cumulative score $CS_A$ for cascade A is incremented by 2, and the next step is S5A.

As indicated by the dashed line after the comparator of the second stage, the cascade A may comprise additional stages not illustrated, processed in a similar fashion to the first and second stages above, and comprising a comparison of the stage score with a corresponding threshold STHA. If the threshold value is not reached, the cascade is exited, and the cumulative score $CS_A$ is incremented by a value based on the stage that is reached. A final weak learner WL K.L of a final stage is shown in FIG. 6, after which a final comparison is performed of the stage score $SS_K$ and the threshold $STHA_K$. If at this step the threshold $STHA_K$ is not reached, the cumulative value incremented by K, before moving to step S5A. If however the threshold $STHA_K$ is reached, the next step is S12A, in which a certainty value for the detection of a face at the current position of the search sub-block is for example incremented. For example, when combined with results of additional cascades for the same search sub-block and/or surrounding search sub-blocks, the detection of a face at the current position may or not be confirmed.

In step S5A, it is determined whether j is equal to 2, in other words whether the third position of the search sub-block has been reached.

If not, the next step is S6A, in which it is determined whether j=J, in other words whether the current position j of the search sub-block is equal to the final position J to be tested, which in this example is position 24. If not, the next step is S7A, in which j is incremented, and the process returns to step S3A for cascade A to be repeated based on the new position j. The cumulative score $CS_A$ is not reset, and thus scores from the previous executions of cascade A are carried over to subsequent executions of cascade A.

If in step S5A j is equal to 2, then the next step is S8A, in which it is checked whether the cumulative score $CS_A$ is greater than a threshold value $TH_A$. If not, the execution of cascade A for the search window position i is stopped, the value j and a cumulative score $CS_B$ are reset to 0 in a step S2B, the search sub-block is set to position j, and a cascade B is executed, as described in more detail below.

Alternatively, if in step S8A the threshold $TH_A$ has been reached, the next step is S7A, in which j is incremented, and cascade A executed again based on the new position of the search sub-window. The execution of cascade A is then repeated until in step S6A j is equal to the final position J, at which time execution of cascade A stops, and the next steps are the initialisation steps S2B and S3B before the execution of cascade B in step S4B. These steps, along with the subsequent steps S5B to S8B, are similar to steps S2A to S8A, and will not be described again in detail. In this example, cascade B comprises three weak-learner tests WL 2.1, WL 2.2 and WL 2.3 in the second stage.

After step S8B, as indicated by a dashed line in FIG. 6, one or more further cascades may be performed, comprising steps similar to steps S2A to S8A and S2B to S8B. Once all of the cascades have been executed for the current search window position i, the next step is S9, in which it is checked with i is equal to the final position I. If not, the next step is S10, in which i is incremented and the process returns to S2A. Otherwise, if i is equal to I, the next step after S9 is S11, in which the processing of strip s ends.

While in steps S5A and S5B of FIG. 6, a verification of whether j is equal to 2 is performed, this value is just one example. This value determines the number of positions of the search sub-block that are tested before an evaluation is made as to whether or not to proceed with testing the current search window. As j is initiated at 0, the test in steps S5A and S5B could test for j equal to 1, 2, 3 . . . J−1, where J is the final search sub-block position. Furthermore, the values in steps S5A and S5B need not be the same as each other, and could be updated.

Figure 7A:
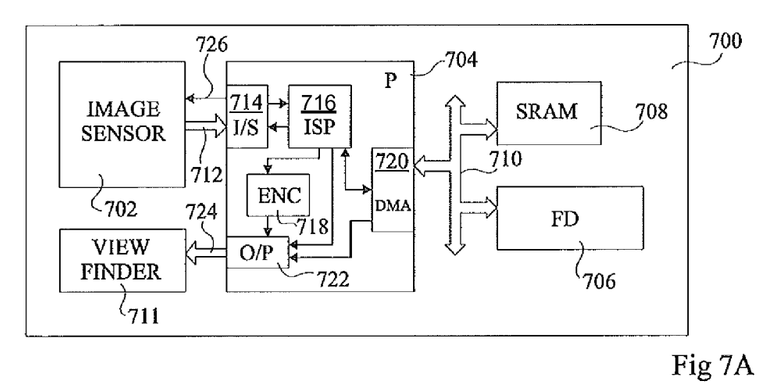
FIGS. 7A to 7C illustrate an image capturing device in varying degrees of detail according to embodiments of the present invention.

FIG. 7A illustrates an image processing device 700 implementing the method of FIGS. 5 and 6. The device 700 is for example a portable device such as a mobile telephone, laptop, digital camera, or other device. Alternatively, device 700 does not comprise integrated image capturing means, and for example could be a general purpose computer, set top box or the like, having a digital camera for capturing images connected to it.

Thus device 700 optionally comprises an image sensor 702 for capturing images. Furthermore, device 700 comprises a processor unit 704, a face detection block 706 and a memory 708. In this example, the memory 708 is an SRAM (static random access memory), although in alternative embodiments other types of memory could be used. The processor unit 704, face detection block 706 and the SRAM 708 are interconnected by a system bus 710. A view finder display 711 is also for example provided, allowing a user to view the final captured image, and also images from the image sensor prior to capturing the final image.

The image sensor 702 provides image data to the processor unit 704 over data lines 712, to an image sensor interface 714 of the processor unit 704. The interface 714 is coupled to an image signal processor (ISP) 716. The ISP 716 is in turn coupled to an encoder 718 (ENC), which converts image data from the image sensor 702 into a particular format, such as JPEG, and to a direct memory access unit (DMA) 720 coupled to bus 710. The ISP 716, encoder 718 and DMA 720 are also coupled to an output interface 722, which outputs a captured image on output lines 724. These lines are for example coupled to a main memory (not shown in FIG. 7A) of the device 700, and as illustrated in FIG. 7A, may also be coupled to the display 711.

In operation, when face detection is to be performed, image data is transferred from the image sensor 702 to the SRAM 708, via the processor unit 704. For example, face detection is performed prior to an image being captured, such that autofocus and/or exposure control can be optimized for any regions of the image view found to contain faces. The ISP 716 for example converts RAW image data from the image sensor 702, which corresponds to the data resulting from the particular colour filter of the image sensor, into a YUV or YCrCb signal, for example having a size of 320 by 240 pixels. This relatively small image for example corresponds to a "view finder" image, which is for example also the image displayed on the view finder display 711 of the device 700. As described above, the image on which face detection is to be performed for example comprises just luminance data, for example the "Y" part of the YUV image. Once this image has been stored in SRAM 708, resizing and face detection are performed on this image by the face detection block 706, as described in more detail below. If one or more faces are detected in the image, the corresponding pixel positions of the face are provided from the face detection block 706 to the ISP 716. In particular, an interrupt is for example generated by the face detection block 706, indicating that the information regarding the pixel positions of the face may be retrieved by the processor unit 704. This information is then for example used by the ISP 716 to control the image sensor 702 via an output line 726 of the image sensor interface. The information may also be displayed in the form of rectangles overlaying the image on view finder display 711, such that the user is aware of the faces that have been detected. Face detection may be performed multiple times, for example every few hundred milliseconds while the device is activated for image capture.

Once a final image is captured, the image data is for example transferred from the image sensor 702 to the ISP 716, which coverts it to an RGB format, which is then compressed into a JPEG image by the encoder 718 prior to output and storage via the output interface 722.

Figure 7B:
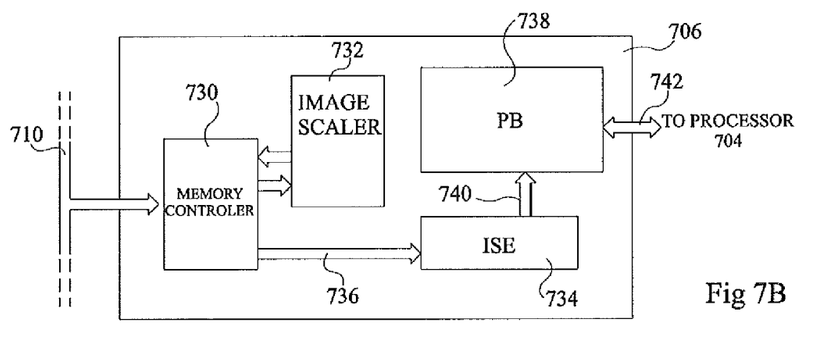

FIG. 7B illustrates the face detection block 706 of FIG. 7A in more detail. A direct memory access unit 730 is coupled to the system bus 710, and is in turn coupled to an image scaler 732 and to an integral and statistics engine 734 (ISE) via data lines 736. The ISE 734 determines the local integral image window. ISE 734 also for example determines an integral square image, allowing a standard deviation of the pixel values in the image to be determined, such that this statistical information can be used to immediately reject a search window, if for example it is determined that for example the pixel information across the sub-block is too uniform to contain a face.

The integral and statistics engine is in turn coupled to a processing block 738 of the face detection block 706 via data lines 740, which for example comprise a direct transfer interface. Furthermore, an interface 742 is for example provided between the processing block 738 and the processor unit 704, allowing results of the face detection to be output.

Figure 7C:
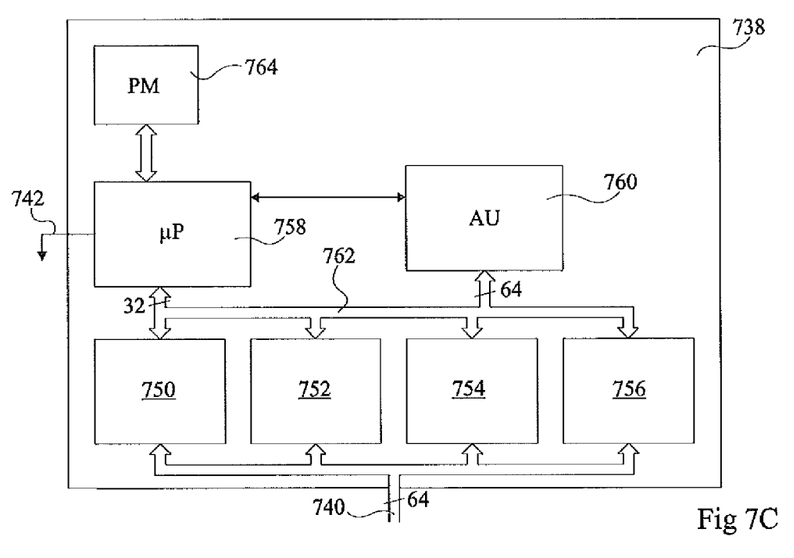

FIG. 7C illustrates the processing block 738 of FIG. 7B in more detail. The input lines 740 are for example 64 bits wide, and provide access to a memory comprising four areas 750, 752, 754 and 756. Areas 750, 752 and 756 are for example RAM, whereas memory 754 is for example ROM (read only memory). Memory area 750 for example stores general purpose data, such as position data of any detected faces, global variables, and user parameters for running the algorithm. Memory area 752 is for example a circular buffer, such as a FIFO (first in first out) buffer, and stores a local integral image window (LIIW), as described above. Advantageously, this memory is separate from the main data memory 708 described above, thereby allowing an efficient execution of the face detection algorithm. Furthermore, by making this buffer a circular buffer, standard memory accesses can be made based on a normal number of virtual addresses for the image, that address a physical memory of much smaller size.

In the above examples, the search window is 24 by 24 pixels, and the integral value for each pixel is for example represented in 24 bits. More than one local integral image window can be stored in the memory 750, which for example has a size of around 8 KB, allowing integral data for up to 16 windows of a same strip to be stored.

Memory area 754 for example stores the instruction sequence corresponding to the cascades to be implemented, such as cascades A, B and so on of FIG. 6. This includes information on each Haar-like feature to be applied during each weak learner step. There may be thousands of Haar-like features, and thousands of weak learners to be applied. This memory is for example stored around 16 KB of data.

The memory area 756 is for example a RAM provided for storing additional cascades that may be added to the face detection algorithm. In particular, a host processor, such as processor unit 704 of FIG. 7A, may load new cascades via the input lines 740.

The processing block 738 additionally comprises a microprocessor μP 758 and an instruction set extension arithmetic unit 760 each coupled to each of the memory areas 750, 752, 754 and 756 via a bus 762. The microprocessor 758 executes instructions from a program memory PM 764.

In operation, the hardware structure of the face detection block 706 allows parallel operation leading to efficient implementation of the face detection algorithm. In particular, advantageously, the original full size image is for example stored in the SRAM 708 throughout the face detection of that image, along with a resized image currently being processed, and the subsequent resized image, which is being generated by the image scaler 732. For this, the SRAM 708 for example has a memory area of approximately 3M bits. Thus the image scaler 732 may operate in parallel with the face detection algorithm. Furthermore, the ISE 734 generates integral data values used in subsequent positions of the search window while a current position of the search window is being analysed. Thus there are three operations that occur simultaneously with each other: image scaling, image integration, and face detection. For example, while a first image is being rescaled, a first search window in a second image is integrated, and a further search window, for example offset by a few windows with respect to first search window, is processed by the face detection algorithm.

Furthermore, it is advantageous to implement the image scaling, integration functions and detector execution using dedicated hardware blocks, and the rest of the face detection algorithm in software, as this leads to a fast implantation, while keeping very high degree of flexibility similar to that of a full software implementation. For executing the face detection algorithm software, advantageously both the microprocessors 758, and 760 are used. Microprocessor 758 uses a first standard instruction set, whereas microprocessor 760 uses a more advanced second instruction set comprising instructions for quickly implementing in a minimal number of cycles more complex operations.

Figure 8:
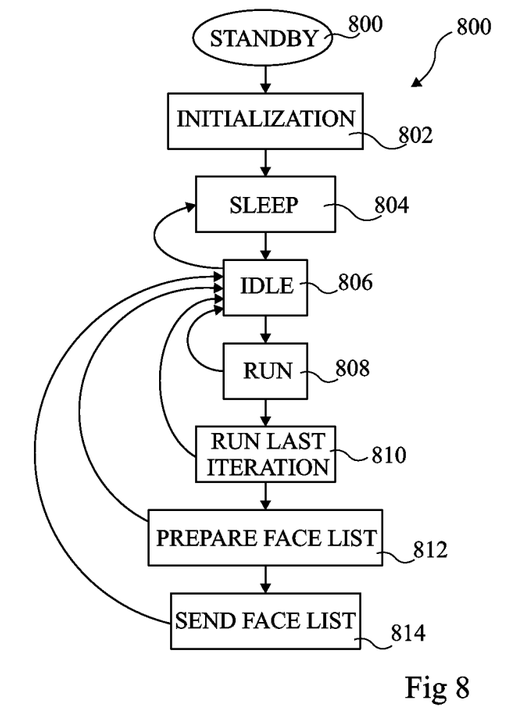
FIG. 8 is a state diagram showing states of a face detection processor of FIG. 7C according to embodiments of the present invention.

The operation of microprocessor 758 of the face detection block will now be described with reference to the state diagram shown in FIG. 8. Initially, after power on of the device 700, the microprocessor 758 is in a standby state 800. Then when an activation signal is enabled, such as a code fetch signal, an initialization state 802 is entered during which data structures are initialized. The microprocessor 758 then waits in a sleep mode 804 which is a low power state.

When faces are to be searched for in an image, the host system, such as the processor unit 704 of FIG. 7A, moves the microprocessor 758 into an idle state 806, from which a run state 808 is entered in which the three tasks of image resizing, image integration, and feature evaluation, in other words the face detection algorithm, are performed in parallel.

When processing the last resized image, the processor 758 enters a state 810 in which a message is sent to the host, such that the host may start to load a new image for face detection into the SRAM 708. Once the last iteration is completed, a state 812 is entered in which the results from all of the searches of each image size are merged, a list of co-ordinates of each detected face is prepared, and the host is informed that the list is ready. Upon acknowledgement from the host, a state 814 is entered and the face list is available for output to the host via interface 742.

The integration step performed by the ISE block 734 will now be described with reference to FIGS. 9A to 9C. As described above, the generation of the integral image is aimed at facilitating the calculation of the sum of the pixel used during the feature evaluation steps of the cascades. By generating the integral image for a few search windows at a time, the overall memory used for storing integral image windows can be relatively small.

Figure 9A:
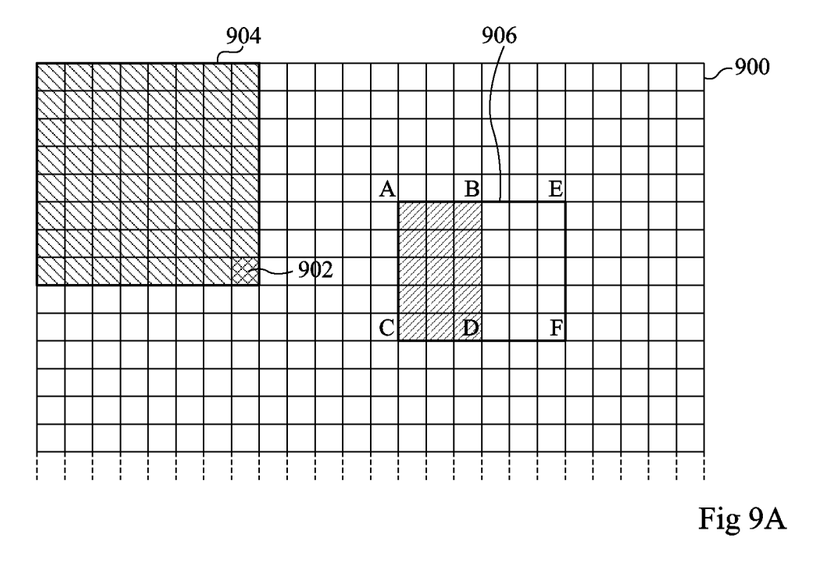
FIGS. 9A, 9B and 9C illustrate integral image generation according to an embodiment of the present invention.

FIG. 9A shows an example of an image 900, comprising pixels delimited by a grid. To perform the integration of this search window, each of the pixel values is replaced by the sum of all of the pixel values of the pixels above and to the left of that pixel. Thus the pixel value of a pixel 902 shown in the image 900 of FIG. 9, positioned in the 8th column from the left of the image and in the 8th row from the top of the image, will be replaced by the sum of the pixel values of a block 904 comprising all the pixels above and to the left of pixel 902.

Once this local integral image window has been generated, the evaluation of Haar-like features is facilitated. For example, the evaluation of the Haar-like feature 906, corresponding to the Haar-like feature 202 of FIG. 2, is reduced to just 6 operations, based on the integral values of pixels A, B, C, D, E and F positioned just above and to the left of the four corners of the shaded region of the feature, and just above and to the left of the right hand corners of the un-shaded region of the feature. The calculation is then simply F+2(B−D)+C−E−A.

When generating the integral value for each pixel, rather than resuming all of the pixels each time, the integration can be performed starting in the top left of the image, and then the integral value previously calculated for the pixel above and/or to the left of each pixel is used to perform the calculation.

According to the embodiments described herein, images are processed in strips. During the calculation of integral values, the processing is also performed in strips each having the same width as the local integral image window. Once the integrals for one strip have been generated, rather than storing these values for use in calculating the values for the next adjacent strip, they are overwritten. This is advantageous as it greatly reduces the memory needed to store the integral data. This will be described in more detail with reference to FIGS. 9B and 9C.

Figure 9B:
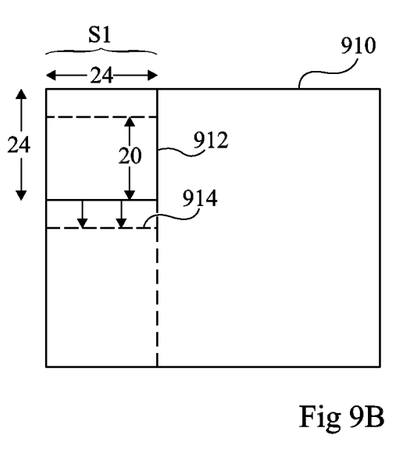

FIG. 9B illustrates an image 910, comprising a first strip S1 at the left hand side, for example having a width of 25 pixels. A local integral image window 912 is calculated for a first 24 by 24 pixel block at the top of strip S1. The subsequent position of the search window, and thus the next local integral image window 914 to be calculated corresponds to the position five pixels down when compared to window 912, as is illustrated by a dashed box in FIG. 9B. The 5 rows of window 912 not present in window 914 are discarded. However, there will be a common block of 24 by 19 pixels between windows 912 and 914 and these values can be reused. Furthermore, when generating the 24 by 5 new pixel integrals of window 914, the values in the bottom row of window 912 are used.

Figure 9C:
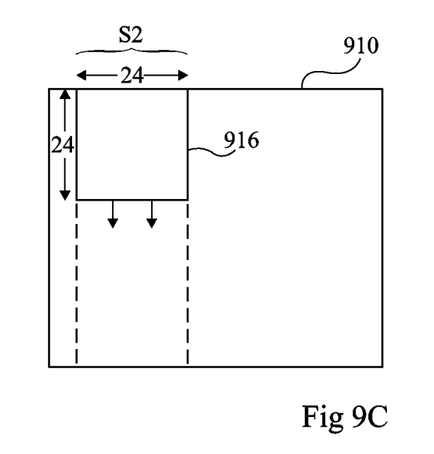

FIG. 9C illustrates the image 910 at the start of processing the next strip S2 adjacent to strip S1. While the local integral image window 916 at the top of this strip is only offset with respect to window 912 by five pixels to the right, the values of window 912 are no longer stored, and thus calculation restarts from zero. In particular, all of the values from the previous strip are discarded, and processing for strip S2 starts anew. In this way, a memory size only corresponding to at most two of the local integral image windows can be used.

An advantage of the present invention is that the processing time and processing resources for performing face detection on an image can be substantially reduced. In particular, data is nearly always available to the processor 758 for running the detection algorithm. Furthermore, the memory and hardware resources required can also be reduced.

While a number of specific embodiments of the present invention have been described, it will be apparent to those skilled in the art that there are numerous alternatives that may be applied.

For example, while the embodiments have been described in relation to face detection, it will be apparent to those skilled in the art that the techniques described herein could be used equally for the detection of other types of objects. Furthermore, it will be apparent to those skilled in the art that the embodiments described herein could be applied to various types of object detection techniques, in which a series of tests are applied.

Furthermore, while some image sizes, and sizes of the search window 108, and search sub-block 302 have been given as examples, it will be apparent to those skilled in the art that other sizes are possible, the search sub-block being smaller in width and/or height than the search window. It will also be apparent that the size of the search sub-block 302 with respect to the search window 108 is a trade-off between increasing the speed of the test, and reducing the risk of missing a face. The present inventors have found that making the width and height of the search window 108 between 10 and 30 percent larger than the search sub-block 302 works well, and a value of around 20 percent works particularly well. The number of pixels that the search window is shifted, equal to 5 in the above examples, will also depends on the relative sizes of the search window and the search sub-block.

Furthermore, it will be apparent that while the resizing step is described as being performed in increments of 0.9, other increments could be used, and although processing advantageously starts with the smallest resized image, in other embodiments it could start with the largest image and work down.

While some examples of cascades A and B have been given, it will be apparent that many variations are possible, and more cascades may be provided. There may be more than two cascades, such as three or more cascades, and the number of cascades to be implemented for a given search window could be user defined in some embodiments.

Furthermore, the calculation of the cumulative scores $CS_A$, $CS_B$ by incrementing a counter based on the stage of the cascade that is reached is merely one example of implementation, and other algorithms could be used. For example, the cumulative scores $CS_A$, $CS_B$ could be based on the stage score SS obtained in one or more stages that have been executed.

What is claimed is:

1. A method of performing, by an image processing device, object detection in an image comprising:
   performing one or more tests of a test sequence for detecting a first object, on pixel values of a plurality of at least partially overlapping sub-regions of a first search window, the first search window comprising a sub-region of the image;
   generating a cumulative score based on results of said one or more tests on said plurality of sub-regions;
   comparing said cumulative score with a threshold value; and based on said comparison, either performing one or more of said tests of said test sequence on at least one further sub-region of said first search window or skipping said tests on a remainder of untested at least partially overlapping sub-regions of said first search window, said at least one further sub-region at least partially overlapping each of said plurality of sub-regions.

2. The method of claim 1, wherein each of said one or more tests comprises:
determining a stage score based on selected pixel values of the sub-region;
comparing said stage score with a stage threshold value; and
selectively performing one or more further tests on pixel values of the sub-region based on said comparison.

3. The method of claim 1, wherein each of said one or more tests comprises analyzing one or more Haar-like features within said plurality of sub-regions.

4. The method of claim 1, wherein said plurality of sub-regions comprises first, second and third sub-regions.

5. A method of performing, by an image processing device, object detection in an image comprising:
performing one or more tests of a test sequence for detecting a first object, on pixel values of a plurality of at least partially overlapping sub-regions of a first search window;
generating a cumulative score based on results of said one or more tests on said plurality of sub-regions;
comparing said cumulative score with a threshold value;
when the cumulative score is greater than the threshold, performing one or more of said tests of said test sequence on at least one further sub-region of said first search window, said at least one further sub-region at least partially overlapping each of said plurality of sub-regions; and
when the cumulative score is not greater than said threshold, performing one or more tests of said test sequence on a plurality of at least partially overlapping sub-regions of a second search window, wherein said second search window is offset with respect to the first search window by a plurality of pixels in at least one direction.

6. The method of claim 5, wherein prior to performing said one or more tests on said plurality of sub-regions of the second search window, performing one or more tests of a second test sequence for detecting a second object on pixel values of said at least partially overlapping sub-regions of the first search window.

7. The method of claim 1, wherein said first search window is between 10 and 30 percent larger than each of said plurality of sub-regions.

8. The method of claim 1, wherein said pixel values are integral values each equal to a sum of pixel values of a determined area.

9. The method of claim 1 wherein said object comprises a face.

10. An image processing device comprising:
a memory storing an image; and
a processing device programmed to:
perform one or more tests of a test sequence for detection of a first object on pixels values of a plurality of at least partially overlapping sub-regions of a first search window;
generate a cumulative score based on results of the one or more tests on the plurality of sub-regions;
compare the cumulative score with a threshold value;
when the cumulative score is greater than the threshold, perform one or more of the tests of the test sequence on at least one further sub-region of the first search window, the at least one further sub-region at least partially overlapping each of the plurality of sub-regions; and
when the cumulative score is not greater than the threshold, perform one or more tests of the test sequence on a plurality of at least partially overlapping sub-regions of a second search window, wherein the second search window is offset with respect to the first search window by a plurality of pixels in at least one direction.

11. The device of claim 10 wherein the device comprises a digital camera.

12. The device of claim 10, wherein the processing device comprises:
a first dedicated hardware block configured to resize the image;
a second dedicated hardware block configured to generate an integral image window by calculating, for each pixel value in the resized image, an integral value equal to the sum of one or more of said pixel values; and
a third dedicated hardware block configured to process said integral image window to detect an object, wherein said first, second, and third dedicated hardware blocks are configured to operate in parallel.

13. The device of claim 12, wherein said first, second, and third dedicated hardware blocks are configured such that while a first image is being resized by said first dedicated hardware block, a first window of a second image is being integrated by said second dedicated hardware block, and a further window of said second image is being processed by said third dedicated hardware block to detect an object.

14. The device of claim 12, wherein said second dedicated hardware block is further configured to determine an integral square image.

15. The device of claim 12, further comprising a memory arranged to store: said image; a resized image for processing by said second dedicated hardware block; and at least part of an image being resized by said first dedicated hardware block.

16. The device of claim 12, further comprising a circular buffer arranged to store said integral image window during the object detection performed by said third dedicated hardware block.

17. The device of claim 12, further comprising a programmable memory configured to store at least one test sequence applied during the object detection performed by said third dedicated hardware block.

18. The device of claim 12, wherein said third dedicated hardware block comprises a microprocessor adapted to execute a first instruction set and an arithmetic unit adapted to perform specific operations.

19. The device of claim 12, further comprising a buffer arranged to store said integral image window prior to processing by said third dedicated hardware block, wherein each value of said integral image for a given pixel position is determined based on a sum of pixels of a rectangle, one corner of the rectangle corresponding to the given pixel position, and a diagonally opposite corner of the rectangle corresponding to a corner of the image, wherein said integral image is processed in overlapping strips of said image extending from one edge of the image to an opposite edge, and wherein all the values stored in said buffer are overwritten at the start of each new strip.

20. A method of performing, by an image processing device, object detection in an image comprising:
receiving the image;
storing the image in a first memory;

performing the following operations by running instructions on a processor:
  performing one or more tests of a test sequence for detecting a first object, on pixel values of a plurality of at least partially overlapping sub-regions of a first search window;
  generating a cumulative score based on results of said one or more tests on said plurality of sub-regions;
  comparing said cumulative score with a threshold value; and
  based on said comparison, either performing one or more tests of said test sequence on at least one further sub-region of said first search window or skipping said tests on a remainder of untested at least partially overlapping sub-regions of said first search window, said at least one further sub-region at least partially overlapping each of said plurality of sub-regions; and
  providing an indication of the detected object.

21. The method of claim 20 wherein providing an indication of the detected object comprises superimposing an indicator over a display of the image.

22. The method of claim 20 wherein the pixel values comprise luminance values.

23. The method of claim 20 further comprising capturing the image using an image sensor.

24. The method of claim 20 wherein the image is an image of a first resolution and further comprising storing the image in a second resolution.

25. The device of claim 12, wherein:
  the first dedicated hardware block comprises a resize unit;
  the second dedicated hardware block comprises an image integration unit; and
  the third dedicated hardware block comprises a processing block.

26. A device for performing object detection in an image comprising:
  means for storing said image;
  means for performing one or more tests of a test sequence for detection of a first object on pixels values of a plurality of at least partially overlapping sub-regions of a first search window;
  means for generating a cumulative score based on results of said one or more tests on said plurality of sub-regions;
  means for comparing said cumulative score with a threshold value; and
  means for, based on said comparison, either performing one or more tests of said test sequence on at least one further sub-region of said first search window or skipping said tests on a remainder of untested at least partially overlapping sub-regions of said first search window, said at least one further sub-region at least partially overlapping each of said plurality of sub-regions.

* * * * *